Figure 1:
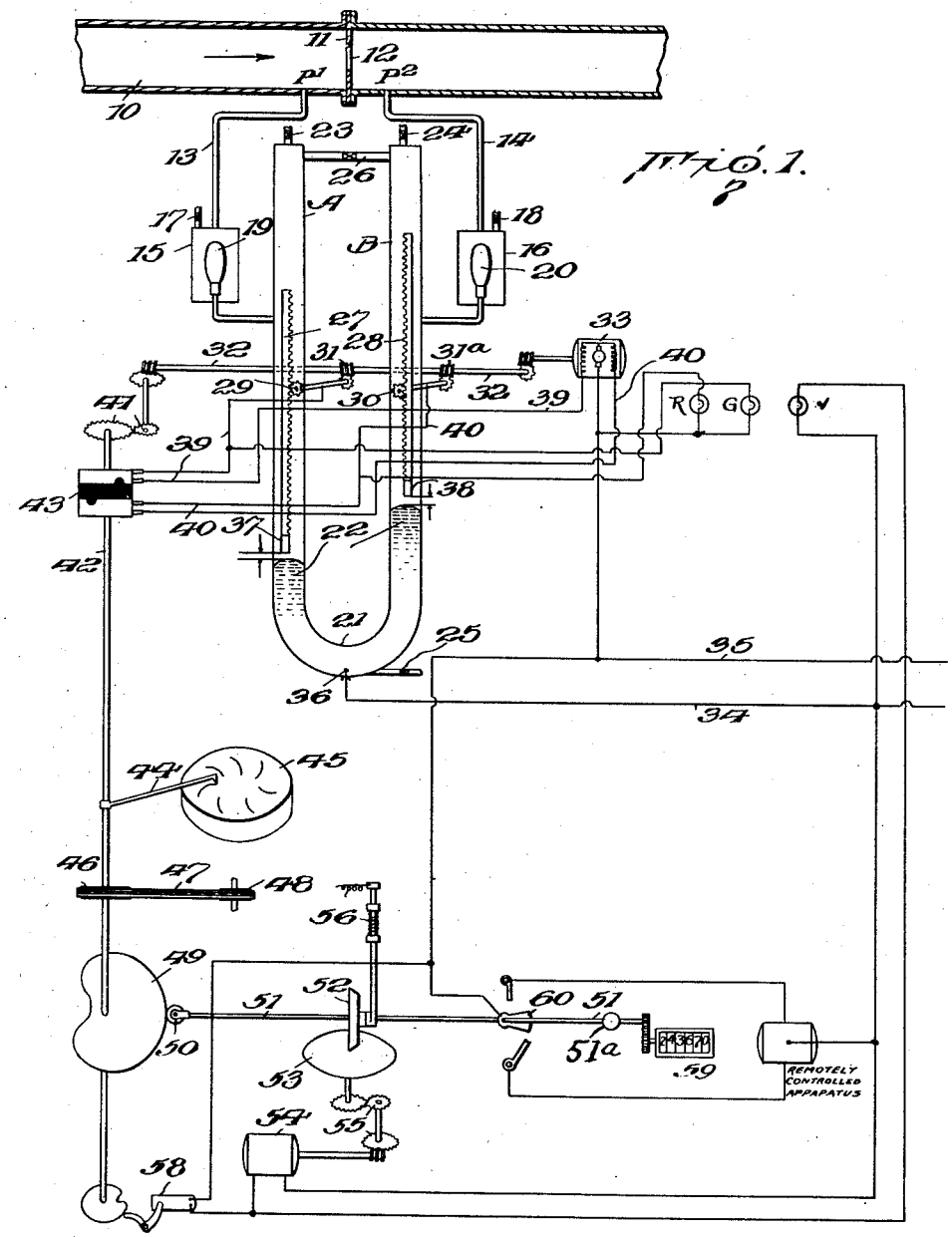

Oct. 16, 1934.  E. STAEGEMANN  1,977,498
FLOW METER
Filed Sept. 30, 1930  2 Sheets-Sheet 1

Inventor
Eugene Staegemann,
By K. P. McElroy
Attorney

Patented Oct. 16, 1934

1,977,498

UNITED STATES PATENT OFFICE 1,977,498

FLOW METER

Eugene Staegemann, Allendale, N. J., assignor to The Permutit Company, New York, N. Y., a corporation of Delaware Application September 30, 1930, Serial No. 485,535

12 Claims. (Cl. 73—167)

This invention relates to flow meters; and it comprises pressure responsive means for accurately measuring and indicating and, if desired, for recording rates of fluid flow which is readily adaptable to integrating and totalizing said flow, to remote indication thereof and to coordination of remote actions therewith; and it more particularly comprises means for measuring and registering a fluid flow and for automatically controlling operations to be coordinated therewith, wherein a pressure difference due to a resistance to said flow is communicated to a moving electrical conductor contacting with following electrodes which function as a reversing switch in an electric motor circuit and which are oppositely moved by rotation of the motor in response to changes in the pressure difference, the motor shaft having a reducing gear connection to an indicating shaft with an integrating cam and follower controlling the speed of an independently rotated integrating shaft and the rotation of the integrating shaft is registered, whereby the electrode movement, reflecting the velocity of fluid flow, is indicated in a linear relation by an angular displacement of the indicating shaft and in turn by the registerable rotation of the integrating shaft; all as more fully hereinafter set forth and as claimed.

In the prior art, fluid flows, such for example as the flow of water through a pipe, have been measured by taking advantage of the fact that the velocity of flow of liquid between two points in a conduit is directly proportional to the square root of the pressure impelling the flow between the two points, that is, of the difference in the pressure of the liquid at the two points. Commonly, in order to produce a substantial pressure difference between two points not too far apart, a constriction such as an orificed plate, a nozzle or a Venturi tube is placed in the conduit carrying the fluid and the pressure drop between the up stream and down stream sides of the constriction is measured in various ways. This is an application of the well known Venturi meter principle. To measure the pressure difference, liquid manometers have been used and particularly mercury manometers. Various indicating and recording instruments are in use in which the differential head of the mercury column is read by means calibrated in terms of rate of flow and in terms of total flow over a period of time. Floats in the mercury mechanically or electrically connected to indicating dials are quite common. Manometers in which the mercury functions as part of one or more electric circuits are known. It has been proposed in making and breaking contact to use a movable electrode contacting with the mercury surface to close and open an electric circuit and to register the height of the movable electrode at the point where it makes and breaks contact with the mercury, the so-called "hunting" contact. The hunting contact has been made either by hand or by means of a geared connection of the single electrode and electrical connection to an electric motor having a reversing switch operated by a solenoid which effects the make and break and produces the hunting contact.

The prior art leaves much to be desired in accuracy of indication and of automatic recording and integration of the flow rate. Prior devices have not provided for automatic control of remote operations which are desired to be coordinated with the fluid flow, such for example as the feed of chemicals in the purification of water or as in the automatic control of water softening systems.

In comparison with the ordinary mechanical flow meter with rotating blades, there are manifest advantages in applying the Venturi principle in indicating rates of flow and in measuring a total flow over a period of time, and particularly in measuring the flow of hot, dirty or turbid water. Where remote operations are to be controlled the energy of the water flowing through a meter is often insufficient to actuate the controlling mechanism and usually the reaction of the controlling mechanism upon the water meter sadly impairs the accuracy of the latter. It is desirable to improve existing methods of measuring fluid flows and of coordinating remote operations therewith.

In the present invention I apply the Venturi principle and in so doing I may use a manometer tube containing an electrically conducting liquid, mercury for example, employing new and improved means for measuring and indicating the differential liquid head of the manometer columns reflecting the rate of flow of a fluid, liquid or gaseous, in a conduit. The manometer is advantageously in the form of a U-tube and mercury or other suitable electrically conductive liquid is placed in the U-tube to form part of an electric circuit. This circuit has a stationary contact with the mercury in the bottom or horizontal portion of the U-tube and one or two movable electrodes adapted to dip into the top of the mercury in either or both of the vertical columns of the manometer. With two electrodes the electric circuit runs through a series wound electric motor having two field windings and the electrode connections are such as to reverse the direction of the motor's rotation by directing the current through the one or other field of the motor as the circuit is closed alternately through one of the two electrodes dipping into the mercury as the columns move up and down with changes in the pressure head. Each electrode has a geared connection with the motor shaft, so arranged that when the mercury rises in one leg of the manometer and makes contact with one electrode the motor starts and raises this electrode out of contact with the mercury and lowers the other electrode; leaving gaps between the mercury and both electrodes. The electrodes are thus caused to move in response to changes in the height of the two mercury columns produced by changes in the pressure head of the liquid through the Venturi tube or orificed conduit. As the differential pressure increases, the responding mercury rise to contact with one electrode effects a rotation of the motor in one direction which raises the one electrode out of contact; as the differential pressure decreases, the mercury makes contact with the second electrode and the motor runs in the opposite direction, raising this second electrode and lowering the first. When the flow rate is constant, both electrodes are out of contact and the motor stops.

The amount of rotation in either direction of the motor shaft is strictly proportional to the manometer pressure head, and by suitable reducing gears this rotation can be communicated to another shaft, called the indicating shaft, in such a way that the maximum pressure difference reflected by the extreme difference in height of the two electrodes effects less than one complete revolution of the indicating shaft. Thus the rate of flow is directly reflected, by means of the electric energy applied to the motor, in the angular deflection of the indicating shaft. The relation between this angular deflection and the electrode movement is linear, that is, equal increments of electrode movement in response to changes in the rate of flow are reflected in corresponding equal increments of deflection of the indicating shaft. It is a simple matter to attach to this shaft an indicating instrument, or, if desired, an indicating and recording instrument calibrated in terms of the rate of fluid flow which actuates the manometer. The torque of the indicating shaft is determined by the power of the motor, and is not dependent upon the energy of the fluid flow.

Integration, by which the flow is totalized and registered, is conveniently effected by means of a cam mounted on the indicating shaft, this cam being of a contour commensurate with the range of the manometer differential and having a follower mounted on an integrating shaft with a friction disc and table rotated at constant speed by a synchronous electric motor or other suitable means. The torque and angular displacement of the indicating shaft thus controls the speed of rotation of the integrating shaft and this speed can be indicated and registered by means of a totalizing revolution counter.

For control of a remote operation the integrating shaft rotation is made to produce intermittent electrical contacts calculated to transmit impulses with a frequency coordinated with the fluid flow, such impulses actuating means for carrying on the desired operation. Or, if desired, the integrating shaft may be made to throw a switch starting a remote operation after a predetermined quantity of fluid shall have passed through the conduit. Or remote transmission of the rotation of the integrating shaft may be obtained by the use of one self-synchronizing motor rotated by the integrating shaft and electrically connected with one or several similar motors located at any desired points.

In the arrangement as described, the electrode in each leg of the U-tube makes contact with the mercury as it rises in either leg in response to a change of the pressure head. Contact of the mercury with either electrode is made to rotate the motor in the direction which raises the electrode making contact, breaking that contact, and simultaneously lowering the other electrode but not sufficiently to make contact with the mercury. Contact is made only by rise of the mercury in either leg and the contact so made is broken by the automatic response of the motor raising the contacting electrode out of contact and then stopping with both electrode out of contact. The motor runs only in response to a change of pressure induced by a change of the rate of fluid flow in the conduit. The rate is at all times reflected exactly in the angular movement of the motor shaft away from the position corresponding to equal height of the two mercury columns, that is to zero pressure difference and no flow.

The present invention includes a method and means of measuring liquid flow in an open conduit or channel. For this a weir is placed in the channel and changes in the height of the liquid over the weir, which varies with the rate of flow, are communicated by means of a float and suitable connections to moving electrical contact elements functioning in a manner similar to that of the manometer liquid as above described. These contact elements are arranged to make contact with other contact elements or electrodes adapted to close a reversible motor circuit and to be moved by resulting rotation of the motor out of contact to open the circuit and stop the motor; the extent of rotation of the motor required to open the circuit being measured as above described.

In the accompanying illustrations, I have shown schematically apparatus within the invention. In this showing, Fig. 1 is a diagrammatic representation, partly in elevation and partly in vertical section, of an indicating, recording, integrating, totalizing and coordinating flow meter.

Figure 2:
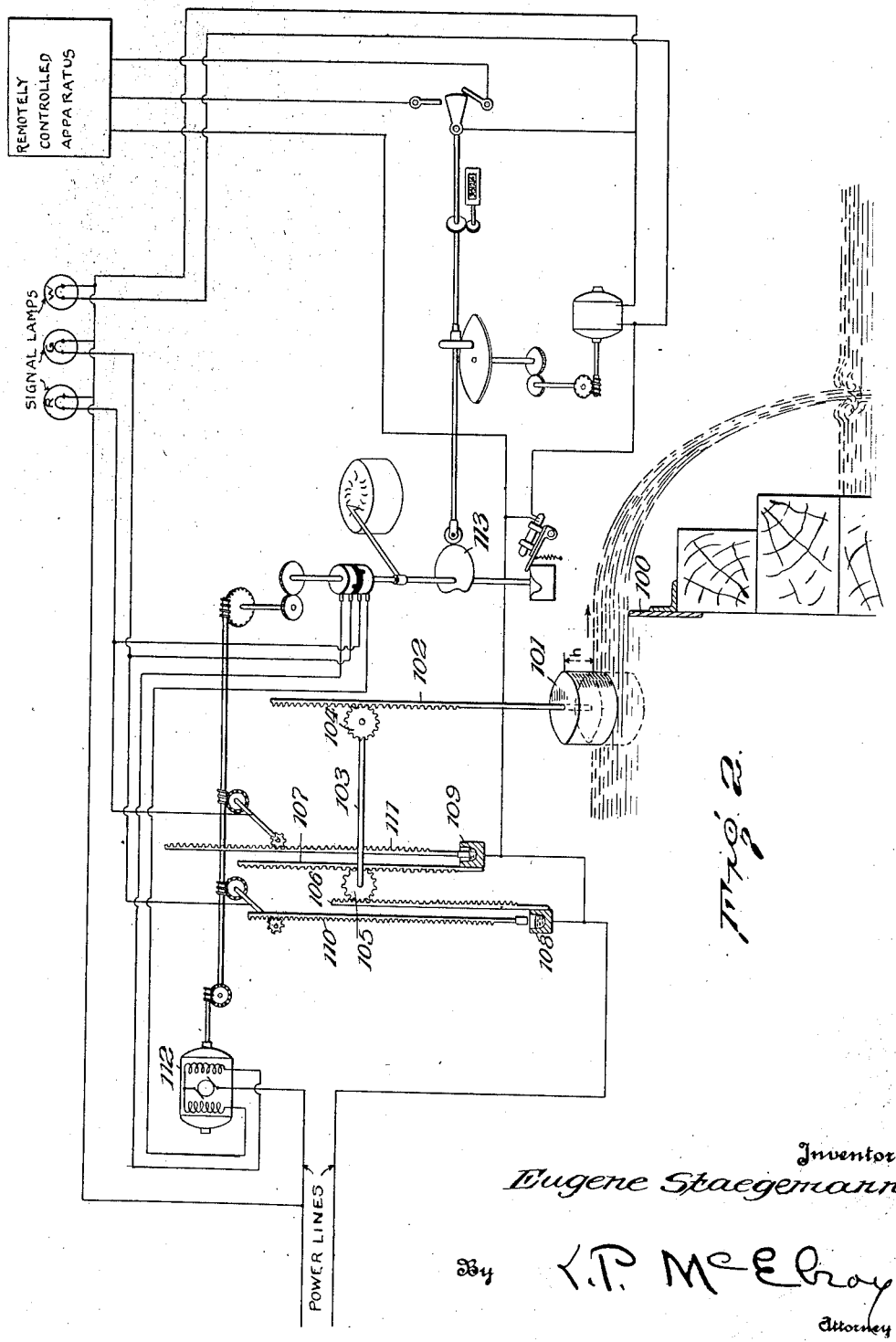

Fig. 2 is a similar representation of a modification of the flow meter of Fig. 1 for open conduits.

In Fig. 1, 10 indicates a conduit in which a fluid, either liquid or gaseous, is flowing in the direction shown by the arrow. A constriction of the conduit is shown as a thin plate 11 with an orifice 12. From points designated P1 and P2 in the conduit above and below this constriction, pipes 13 and 14 run to respective containers 15 and 16 filled with fluid from the conduit, the two containers being provided with cocks 17 and 18 for venting and filling purposes, the fluid pressure in these containers when both cocks are closed being the same as the conduit pressure above and below the constriction respectively. In the containers are soft rubber bulbs or other flexible diaphragms 19 and 20 connected respectively to the two vertical legs A and B of manometer 21 containing conducting liquid 22 in columns as shown. Mercury is a suitable liquid conductor. Near top and bottom of the manometer are cocks 23, 24, 25 for filling and emptying and valved equalizing tube 26 connects the top portions of the two legs. Advantageously, the space above the mercury in the manometer legs is filled with a non-conducting inert fluid such as glycerin or argon and the bulbs 19 and 20 may contain the same fluid. In the manometer legs are racked electrodes 27 and 28 engaged and guided in the manometer tubes by pinions 29 and 30 which are connected through stuffing boxes and housings (not shown) by worm gears 31 and 31a with shaft 32 geared to the shaft of series wound motor 33 taking electric current from power leads 34 and 35. The worm gear at 31 turns the pinion 29 in the reverse direction to that of pinion 30 as turned by worm gear 31a. Lead 34 has a stationary contact 36 with the mercury in the manometer and the electrode tips 37 and 38, which may be of phosphor bronze, are adapted to alternatively complete the motor circuit through lines 39 and 40 leading respectively through pinions 29 and 30 from electrodes 27 and 28 to the alternate ends of either the field wires or the armature connections of the series wound motor 33. Series wound reversing motors are well known. The connections are such that when the motor circuit is completed through electrode 27 the motor rotates in one direction and when the circuit is closed through electrode 28 the direction of rotation is reversed.

Rotation of shaft 32 corresponds with that of the motor and shaft 32 is connected through a system of reducing gears at 41 with indicating shaft 42. As the fluid flow (water, steam or gas) in conduit 10 increases, the pressure difference between P1 and P2 increases, the differential pressures are communicated through bulbs 19 and 20 to the manometer, and the mercury rises in B and falls in A. The resulting contact of the mercury with electrode 28 starts the motor, the wiring and gearing being so arranged that electrode 28 is raised until the contact is broken and electrode 27 is lowered but not sufficiently to make contact. The motor then stops, the positions of the electrodes, which reflect the pressure difference, being in turn reflected in the angular position of shaft 42 in rigid connection with the motor shaft. The relationship is linear; equal increments of pressure difference being indicated by equal increments of rotation of shaft 42. Gearing 41 is so designed that shaft 42 makes less than one complete revolution for the maximum difference in height of the mercury columns and following electrodes. With an unchanging rate of flow and constant P1—P2 pressure difference, the motor is at rest and the electrodes stationary. If the pressure difference (rate of flow) decreases, the mercury rises in A and falls in B and the resulting contact with electrode 27 starts the motor in the direction of rotation which raises electrode 27 and lowers electrode 28 until the contact is broken and a gap occurs between the mercury and both electrode tips. Only changes in the rate of flow cause the motor to run. The height of electrode 28 and the angular deflection of shaft 42 are determined exactly by the flow in conduit 10.

The invention lends itself readily to apparatus design meeting the particular conditions of the desired flow measurement. Thus the size of the constriction orifice 12 and the position of points P1 and P2 may be so chosen as to give a desired maximum pressure head, 12 inches for example, in the manometer. To avoid damage to the instrument, should the pressure head become abnormal and tend to drive the electrode racks off their pinions, a double circuit breaker 43 in electric lines 39 and 40 is placed on shaft 42 and is adjusted to break the motor circuit should the angular deflection of shaft 42 reach that corresponding to a pressure head of, say, 13 inches or should an abnormal condition cause the pressure at P2 to exceed that at P1, and the mercury level in A to rise more than, say, 2 inches above that in B.

Signal lamps G and R are connected in parallel to lines 39 and 40 respectively, to be lighted when pressure changes are occuring and the electrodes are making a succession of contacts with the mercury. Differently colored lamps and preferably lamps having high resistance may be used to tell which electrode is making contact and thus whether the flow pressure is increasing or decreasing. When lead line 39 becomes energized by contact made in leg A of the manometer, the green lamp is lighted brightly while the red lamp glows dimly by reason of a small current transmission to lead line 40 through the series field winding of the motor; and similarly the green lamp glows dimly with current received through line 39 when the red lamp is lighted brightly by the energizing of line 40 through the mercury contact made in leg B. The lamp connections with lines 39 and 40 provide that when both electrodes are out of contact the lamps are unlighted, both of lines 39 and 40 being then deenergized. The lamps may of course be located at desired distances from the apparatus.

Indication and recording of the angular deflection of shaft 42 corresponding to the pressure head and the flow rate are very conveniently arranged through an indicating needle and recording chart designated by 44 and 45. This instrument may be made to be read in terms of flow rates such for example as gallons per minute.

Thus far, a method or means of measuring rates of flow has been described. Integration or totalization of the flow or coordination of remote actions with the rate of flow can be effected in a number of ways. The angular deflection of shaft 42 is a square function of the rate of flow and this angular deflection is communicated mechanically or electrically to other mechanism for purposes of control. A sprocket wheel 46 on shaft 42 with a chain 47 operating wheel 48 is adaptable to adjustment of valves or other feeding means as a function of the fluid flow in conduit 10. In this respect wheel 48 may be taken to represent a valve wheel. An integrating means is provided in cam 49 with follower 50 on integrating shaft 51 carrying friction disc 52 in contact with table 53 which is turned by a synchronous or constant speed motor 54 through gear mechanism 55. Shaft 51 and cam follower 50 are pressed against cam 49 by spring and bearing mechanism 56. The contour of cam 49 is preferably such that its radius is a square root function of the angular deflection of shaft 42 and is made to correspond with the normal range of the manometer pressure head as caused by the fluid flow. The table 53 is turned with substantially constant speed and the rate of rotation of shaft 51 is varied according to the position of disc 52 on table 53, that is, with the position of cam 49 as it changes with the degree of deflection of shaft 42. At zero deflection friction disc 52 is preferably at the exact center of table 53 and shaft 51 does not rotate. As shaft 42 is deflected in response to a flow in conduit 10, cam 49 pushes disc 52 across table 53 and shaft 51 rotates with a speed proportionate with the fluid flow. The use of a synchronous motor to turn table 53 is advantageous in that its speed coincides exactly with the cycle frequency of the power line which, in present day public utility service is substantially unchanging. The synchronous motor has been used as a time piece. To register the total flow over a given time a register 59 of the type of a revolution counter or speedometer is geared to shaft 51. This register can be calibrated so as to read in terms of quantity of flow. The described organization has an advantage in that the rate of flow per unit of time may, if desired, be registered by means of a properly calibrated speedometer 51a driven by shaft 51.

A circuit breaker 58 in the synchronous motor circuit is placed on shaft 42. This circuit breaker may be adjusted to keep the circuit open except when the manometer pressure head exceeds, say, about one half inch. By connecting a signal lamp W across the synchronous motor (54) terminals, remote indication of the motor operation is obtained. When circuit breaker 58 is closed, this signal light is lighted. White, green and red lamps connected respectively to the synchronous motor, and as above described to electrodes 27 and 28, indicate: when all lights are out, that either no fluid is flowing or the current has failed; when white light is on with green and red off, fluid is flowing at constant rate within the limits of the meter; when green and red are lighted, the flow rate is changing and the direction of rotation of the motor and thus whether the flow is increasing or decreasing may be judged from the different intensities of the two colored lights; and when green and red are both lighted continuously, then the meter is out of function and needs attention.

An apportioning device is shown as controlled by the frequency of electrical contacts made by shaft 51 in contactor 60 closing and opening the circuit of a motor operating a feeding device such for example as that of the Cawley Patent 1,678,766. Use of the present meter in the Cawley acid feed effects an increase of accuracy. The rate of fluid flow in conduit 10 controls the frequency with which contactor 60 closes its motor circuit and the motor function is thus coordinated with the fluid flow.

Referring to Fig. 2, 100 is a weir, 101 a float, moving through distance $h$, corresponding to the height of the water above or in the weir or notch, the height of $h$ being a function of the rate of flow. The float travel $h$ is communicated by mechanical means, as by a rack 102, causing rotation of shaft 103 fastened to gear 104. Shaft 103 is connected with gear 105 which engages with two racks 106 and 107, the respective travels of which are in mutually opposing directions. The distance of the travels of racks 106 and 107, with respect to the float travel $h$, may be increased or diminished by changing the gear ratio of gear 104 to gear 105.

At the lower ends of racks 106 and 107 are attached contact making elements, 108 and 109, such as receptacles for mercury, preferably covered with some electrically non-conductive liquid as glycerine. These contact making elements 108 and 109 correspond in function to the surfaces of the conducting liquid 22 of Fig. 1, previously described for use in the measurement of fluids flowing in closed conduits.

Suspended above the surface of the contact making elements 108 and 109 are movable electrodes 110 and 111 which are electrically connected to the reversible motor 112. The rotation of the reversible motor 112 thus becomes a function of the float travel $h$ and so a function of the rate of flow of the water going over the weir. The means for recording, indicating, integrating and coordinating proportioning feeding devices and for controlling events remote from the apparatus are identical with the devices previously described with reference to Fig. 1.

While the contour of the integrating cam 49 for the manometer type of flow meter, responding to a differential pressure from a Venturi tube or orifice plate, is such that its radius vector is a square root function of the rate of flow, in the present modification the contour of the integrating cam 113 must correspond with the relationship of travel $h$ to the rate of flow. This will depend upon the type of weir employed.

Accuracy of measurement, positive action and closeness of coordination are among the advantageous results accomplished by this invention.

What I claim is:—

1. A pressure responsive device comprising in combination one electrical contact element adapted to be moved in response to a fluid pressure, a second electrical contact element supported above the first contact element and adapted to be contacted by said first contact element upon its pressure-responsive movement, an electric circuit including both of said contact elements and adapted to be closed by their contact, an electric motor in said circuit having a rotor with a shaft and rotary gearing so connecting said rotor to said second contact element that rotation of the motor following said pressure-responsive contact moves the second contact element completely out of contact with said first contact element to open said circuit and to stop the motor, a second shaft geared to the motor and adapted to be rotated by the motor directly in proportion to its driving movement and through less than a complete revolution as said contact is broken by the motor and to give in its rotary movement a linear indication of the extent of the pressure-responsive movement of said first contact element, and means actuated by said rotatory movement for coordinating an operation with said fluid pressure.

2. A pressure responsive device comprising in combination a mercury manometer actuated by a fluid pressure, a movable contact electrode supported above the mercury in the manometer and adapted to be contacted by the mercury upon its pressure responsive movement, an electric circuit including the mercury and the contact electrode and adapted to be closed by contact of the two, an electric motor in said circuit having a rotor with a shaft and rotary gearing so connecting said rotor to said electrode that rotation of the motor following said pressure responsive contact moves the electrode completely out of contact with the mercury to open said circuit and to stop the motor, a second shaft geared to the motor and rotated by said motor directly in proportion to its driving movement and through less than a complete revolution so as to indicate the fluid pressure by the extent of its rotatory movement in linear relation to the extent of the pressure-responsive movement of the mercury in the manometer and means actuated by said rotary movement for registering said fluid pressure.

3. In a flow meter, a movable body of electrically conducting liquid in a container, means for imparting movement to said body in response to change in a pressure head associated with the fluid flow to be measured, a movable electrode supported above the liquid in said container and adapted to make contact with said liquid upon its pressure-responsive movement, an electric circuit including said electrode and said liquid and adapted to be completed by said contact, a rotary electric motor in said circuit, a shaft and gearing so connecting the motor to said electrode that rotation of the motor following said pressure-responsive contact moves the electrode sufficiently to break said contact, thereby stopping said rotation, a second shaft geared to the motor and adapted to be rotated by the motor directly in proportion to its driving movement and through less than a complete revolution as said contact is broken and to reflect in its angular deflection and in a linear relation the pressure-responsive movement of said conducting liquid and means actuated by said rotatory movement for coordinating an operation with said fluid flow.

4. A pressure responsive device comprising in combination a two column pressure manometer containing a body of mercury, two movable contact electrodes supported in the manometer columns and adapted to be alternatively contacted by the mercury upon its pressure-responsive rise in either column, two parallel electric circuits including the mercury and the respective electrodes and adapted to be closed by their respective contacts, a reversible rotary electric motor connected in both of said circuits and adapted to rotate in opposite directions according as one or the other of the two circuits is closed by its respective pressure-responsive electrode contact, a shaft and rotary gearing so connecting the motor to both electrodes as to simultaneously raise either electrode and lower the other and to open both motor circuits, a separate second shaft adapted to be rotated by said connecting shaft directly in proportion to the driving movement of said connecting shaft so as to reflect in its angular position and in a linear relation heights of the mercury columns and means for transmitting the rotary motion of said shaft to control an operation in response to said fluid pressure.

5. A flow meter comprising a conduit, an obstruction to the flow of fluid in said conduit, two mercury contact elements both mechanically and electrically connected and adapted to be moved in opposite directions in response to changes in the pressure head due to said obstruction, two oppositely movable electrodes supported above said contact elements and adapted to be contacted respectively and alternatively by said contact elements upon their pressure-responsive movement, an electric circuit including said contact elements and said electrodes connected in parallel in said circuit, a reversible rotary motor in said circuit energized to rotate in opposite directions according as said circuit is closed by one electrode contact or the other, a shaft and rotary gearing so connecting the motor to the two electrodes that said rotation of the motor moves the electrodes in opposite directions to break the circuit and to stop the motor, a second shaft adapted to be rotated by said connecting shaft directly in proportion to its driving movement and through angles less than a complete revolution corresponding in a linear relation with the movements of the electrodes required to break said circuit and means actuated by said angular rotation for indicating said fluid flow.

6. In a flow meter, a conduit, a constriction in said conduit, two fluid connections from points in the conduit upstream and downstream of said constriction, a manometer having vertical legs respectively communicating with said two connections and containing connected columns of an electrically conducting liquid, racked electrodes supported in said two legs, an electrical circuit adapted to be alternatively completed by contact of the liquid with either of said electrodes, a rotary electric motor in said circuit adapted to be rotated in respectively opposite directions according as said circuit is closed by one electrode contact or the other, a shaft and rotary gearing connecting both racked electrodes to the rotor of the motor and adapted to simultaneously raise either electrode and lower the other as the motor rotates in either direction and a rotary shaft geared to the motor and provided with means for indicating the differential height of the manometer liquid columns corresponding to the rotary position of said shaft.

7. In a flow meter, an open conduit, a weir in said conduit, a float movable by changes in the height of liquid flowing over said weir, two electrical contact elements, means connected to said float and adapted to move said contact elements in opposite directions in response to movements of said float, two oppositely movable electrodes adapted to be contacted respectively and alternatively by said contact elements upon their movement by the float, an electric circuit closed by either of said contacts, a reversible motor in said circuit adapted to rotate in opposite directions according as said circuit is closed by one electrode or the other, mechanical means so connecting the motor shaft to the two electrodes that rotation of the motor moves either electrode closing the circuit out of contact with its contact element to open the circuit and means indicating the extent of said rotation.

8. In a flow meter comprising movable mercury contact elements with two following electrodes adapted to be alternatively contacted by the mercury elements upon movement thereof responsive to change in pressure head associated with a fluid flow and also comprising an electric circuit adapted to be closed by said mercury contacts and a motor in said circuit having geared operating connections with said electrodes adapted to move the electrodes out of contact with the mercury upon said circuit closing, an improvement which comprises an indicating shaft operatively geared to said motor and adapted to be rotated directly in proportion to the driving movement of the motor and through less than a complete revolution as the motor moves an electrode out of its mercury contact, said indicating shaft being adapted to give by variation of its angular position a linear representation of change in said pressure head as reflected in said electrode movement, and means actuated by the rotating movement of said shaft for indicating said rate of flow.

9. In a flow meter comprising movable mercury contact elements with following electrodes adapted to be contacted by the mercury upon movement thereof responsive to pressure change associated with a fluid flow and also comprising an electric motor in a circuit adapted to be closed by said mercury contact, said motor having operating connections with said electrodes adapted to move the electrodes out of contact with the mercury upon said circuit closing, an improvement which comprises an indicating shaft having an operating connection with the motor adapted to rotate the shaft through a part of a revolution as the motor moves an electrode out of said mercury contact, said indicating shaft being thereby adapted to reflect in its angular position the rate of the fluid flow, an integrating cam turned by said indicating shaft, an integrating shaft adapted to be longitudinally moved by said cam and a friction disc with an independently rotated integrating table adapted to rotate the integrating shaft, the speed of said rotation being controlled by the longitudinal position of the integrating shaft as determined by the integrating cam and the angular deflection of the indicating shaft.

10. In the flow meter of claim 9, means for indicating the total fluid flow over a period of time which comprises a revolution counter having an operating connection with the integrating shaft.

11. A flow meter adapted to automatic coordination of remote actions with the measured flow which comprises the flow meter of claim 9, a contactor adapted to be rotated by the integrating shaft, an electric circuit including circuit controlling contact elements adapted to be contacted by said contactor upon rotation thereof, and mechanism energized by said contacts with a frequency determined by the rate of flow reflected in the rotational speed of the integrating shaft as controlled by the angular deflection of the indicating shaft and the contour of the integrating cam.

12. In a flow meter comprising movable electrical contact elements with movable electrodes adapted to be contacted therewith upon movement of said elements in response to pressure change associated with a variable fluid flow and also comprising an electric circuit adapted to be closed by said contacts and a rotary electric motor in said circuit having an operating connection with said electrodes adapted to move the electrodes out of said contacts upon said circuit closing, means for coordinating an operation with said variable fluid flow which comprises a rotary shaft in geared connection with the rotor of the motor and adapted to be rotated by the motor directly in proportion to its driving movement so as to respond in a linear relation to said pressure change and operating means in a geared connection with said rotary shaft and controlled by the rotary movement thereof so as to respond to change in the rate of said fluid flow as reflected in said electrode movement.

EUGENE STAEGEMANN.